United States Patent
Yeom

(10) Patent No.: US 9,475,351 B2
(45) Date of Patent: Oct. 25, 2016

(54) INTELLIGENT TIRE SYSTEM

(71) Applicant: Hyundai Motor Company, Seoul (KR)

(72) Inventor: Myung Ki Yeom, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/321,578

(22) Filed: Jul. 1, 2014

(65) Prior Publication Data

US 2015/0153250 A1    Jun. 4, 2015

(30) Foreign Application Priority Data

Dec. 3, 2013  (KR) .................. 10-2013-0149372

(51) Int. Cl.
| | |
|---|---|
| *B60C 23/00* | (2006.01) |
| *E01C 23/00* | (2006.01) |
| *G01M 17/02* | (2006.01) |
| *B60C 23/06* | (2006.01) |

(52) U.S. Cl.
CPC .................................. *B60C 23/066* (2013.01)

(58) Field of Classification Search
None
See application file for complete search history.

(56) References Cited

U.S. PATENT DOCUMENTS

| | | | | |
|---|---|---|---|---|
| 3,768,532 | A * | 10/1973 | Arai ..................... | B60B 11/10 |
| | | | | 152/151 |
| 5,969,239 | A * | 10/1999 | Tromeur et al. ............. | 73/146.5 |
| 6,339,956 | B1 | 1/2002 | Huinink et al. | |
| 6,631,637 | B2 * | 10/2003 | Losey ............................. | 73/146 |
| 6,662,665 | B1 * | 12/2003 | Huang ........................... | 73/756 |
| 6,985,117 | B2 * | 1/2006 | Voigtlaender et al. ....... | 343/711 |
| 7,091,840 | B2 * | 8/2006 | Ichinose ...................... | 340/447 |
| 7,104,438 | B2 * | 9/2006 | Benedict ...................... | 235/375 |
| 7,114,383 | B2 * | 10/2006 | Byrne ............................ | 73/146 |
| 7,441,452 | B2 * | 10/2008 | Phalak et al. .................. | 73/146 |
| 8,342,216 | B2 * | 1/2013 | Froger ..................... | B60C 3/04 |
| | | | | 152/208 |
| 8,714,002 | B2 * | 5/2014 | Faretra ........................ | 73/146.2 |

FOREIGN PATENT DOCUMENTS

| | | |
|---|---|---|
| JP | 2004-130966 A | 4/2004 |
| JP | 2004-314728 A | 11/2004 |
| JP | 2004-331038 A | 11/2004 |
| JP | 2006-258241 A | 9/2006 |
| KR | 1020110051512 A | 5/2011 |
| KR | 1020120060536 A | 6/2012 |

* cited by examiner

*Primary Examiner* — Michael A Lyons
*Assistant Examiner* — Jermaine Jenkins
(74) *Attorney, Agent, or Firm* — Morgan, Lewis & Bockius LLP

(57) ABSTRACT

An intelligent tire system may include a bearing assembly enclosing a wheel rim and a sensor module installed to be relatively rotated with respect to the wheel rim by the bearing assembly and continuously sensing an inner surface of a tire contacting a road.

9 Claims, 4 Drawing Sheets

INTELLIGENT TIRE SYSTEM

CROSS REFERENCE TO RELATED APPLICATION

The present application claims priority of Korean Patent Application Number 10-2013-0149372 filed on Dec. 3, 2013, the entire contents of which is incorporated herein for all purposes by this reference.

BACKGROUND OF THE INVENTION

1. Field of the Invention

The present invention relates to an intelligent tire system, and more particularly, to an intelligent tire system capable of improving measurement precision by continuously measuring variation of a tire even in a case in which a wheel is rotated.

2. Description of Related Art

An intelligent tire system is a system predicting or measuring force acting on a tire by attaching a sensor to the tire to sense a change in a rubber surface of the tire.

The above mentioned intelligent tire system is used for a chassis control logic of a vehicle, such that it is utilized to improve driving stability and riding quality of the vehicle.

That is, a tire variation measuring sensor is embedded in the tire and a controlling unit converts the measured variation of the tire into force and estimates a slip angle of the tire, a road friction coefficient, and the like to utilize in various chassis control logics.

FIG. 1 is a view for schematically describing a configuration of an intelligent tire system according to the related art, wherein a sensor 2 is fixed to a wheel rim 1, such that when the sensor 2 is directed to a road at the time of the rotation of the wheel, the variation in the tire rubber surface is sensed by the sensor 2.

However, the related art as mentioned above measures the variation of the tire only once per one rotation of the wheel rim since the sensor is rotated together with the wheel rim. Therefore, there is a limitation in improving precision in response to the variation measurement of the tire.

However, even though the scheme according to the related art is used, since the variation is measured only once per one rotation of the wheel, there is a limitation in improving precision of the variation measurement.

The matters described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an intelligent tire system capable of improving measurement precision by continuously measuring variation of a tire even in a case in which a wheel is rotated.

In an aspect of the present invention, an intelligent tire system may include a bearing assembly enclosing a wheel rim, and a sensor module installed to be relatively rotated with respect to the wheel rim by the bearing assembly and continuously sensing an inner surface of a tire contacting a road.

The bearing assembly may include an inner race fixed to the wheel rim, an outer race having the sensor module fixed thereto and relatively rotating with respect to the inner race, and a roller installed between the inner race and the outer race.

The sensor module may have a sensor installed at an end portion thereof, the sensor sensing the inner surface of the tire contacting the road.

The sensor module may have a light source installed at a side portion thereof, the light source illuminating the inner surface of the tire contacting the road.

The sensor is a camera sensor.

The inner surface of the tire is provided with a pattern, and the sensor senses the pattern.

The intelligent tire system may further include a wireless transmitting unit receiving information on the sensed pattern from the sensor, a wireless receiving unit receiving the information on the pattern input through the sensor from the wireless transmitting unit, and an intelligent tire Engine Control Unit (ECU) receiving the information on the sensed pattern from the wireless receiving unit and determining variation of the information on the pattern varied according to variation of the tire.

The intelligent tire system may further include a first magnetic substance installed in the sensor module, and a second magnetic substance installed on a car body positioned over the first magnetic substance and limiting a rotation of the first magnetic substance by magnetic force therebetween.

The first magnetic substance and the second magnetic substance are a permanent magnet or an electromagnet.

The car body having the second magnetic substance installed thereon is a brake dust cover.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
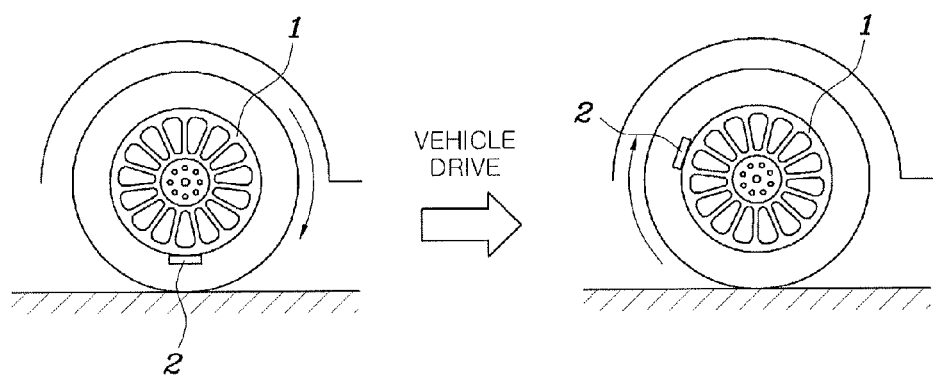
FIG. 1 is a view for describing a tire measurement operating relationship in an intelligent tire system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be described in detail with reference to the accompanying drawings.

Figure 2:
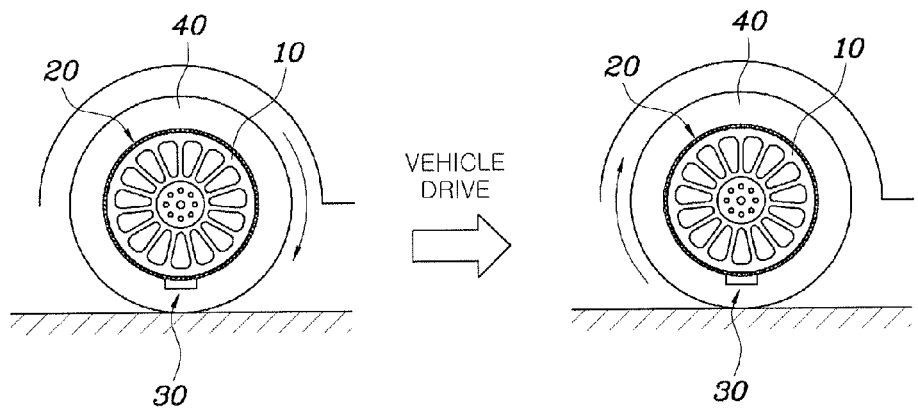
FIG. 2 is a view for describing a tire measurement operating relationship in an intelligent tire system according to an exemplary embodiment of the present invention.
Figure 3:
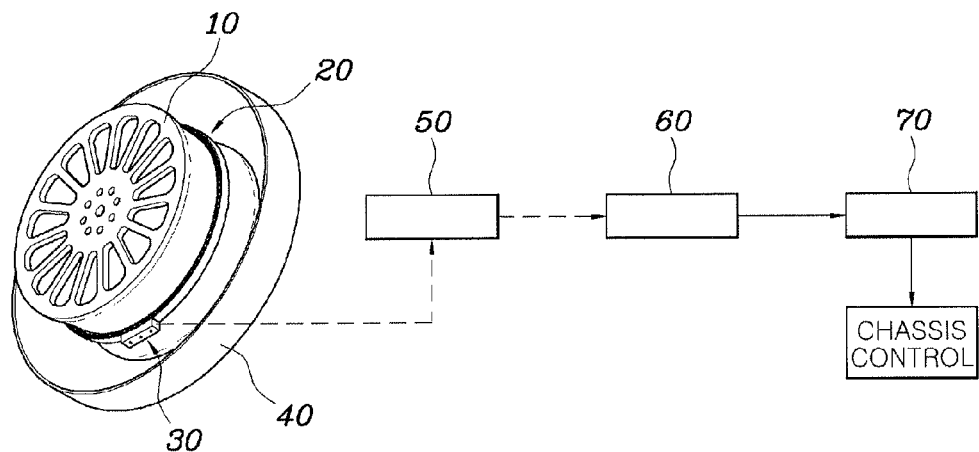
FIG. 3 is a view showing an entire configuration of the intelligent tire system according to the exemplary embodiment of the present invention.
Figure 4:
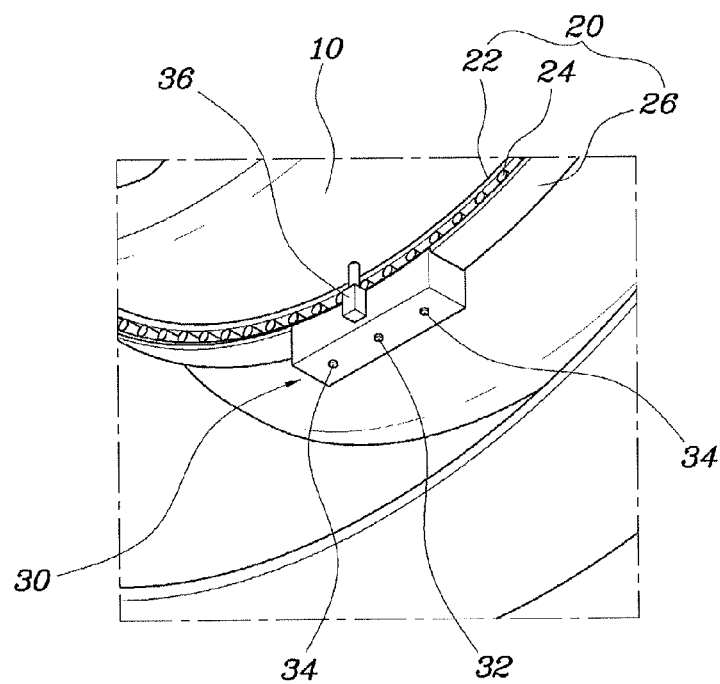
FIG. 4 is an enlarged view of a shape of a sensor module in the intelligent tire system according to the exemplary embodiment of the present invention.
Figure 5:
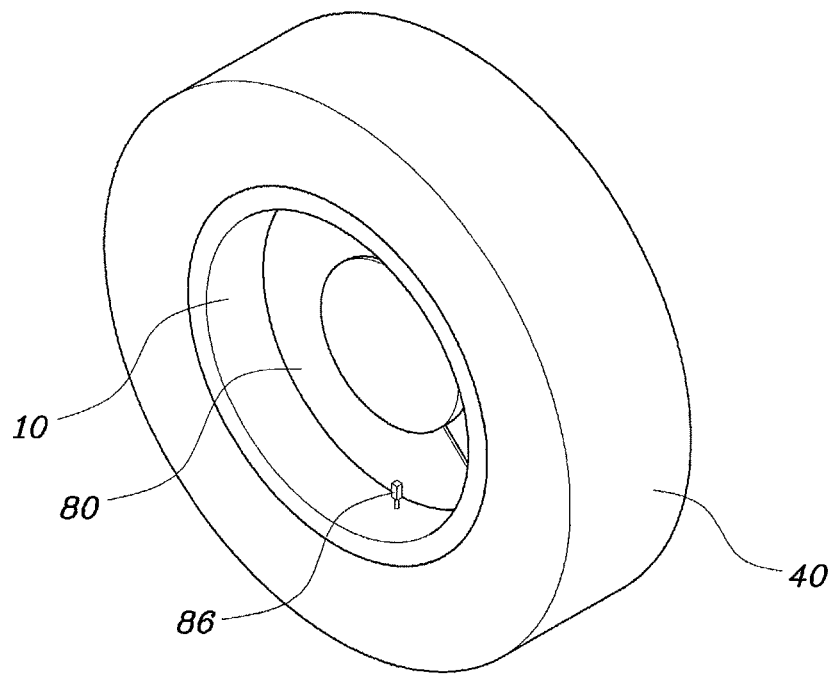
FIG. 5 is a view for describing an installation position of a second magnetic substance in the intelligent tire system according to the exemplary embodiment of the present invention.
Figure 6:
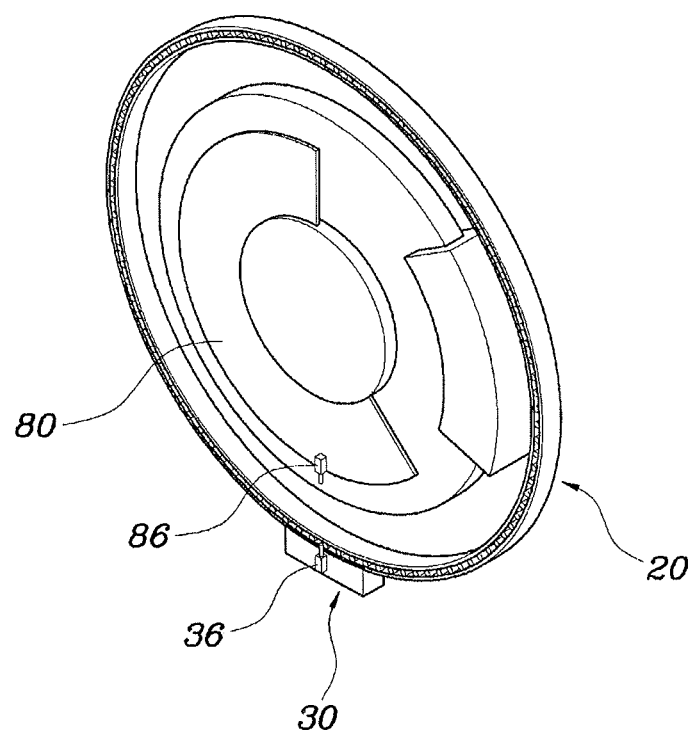
FIG. 6 is a view for describing an arrangement relationship of a first magnetic substance and the second magnetic substance in the intelligent tire system according to the exemplary embodiment of the present invention.
Figure 7:
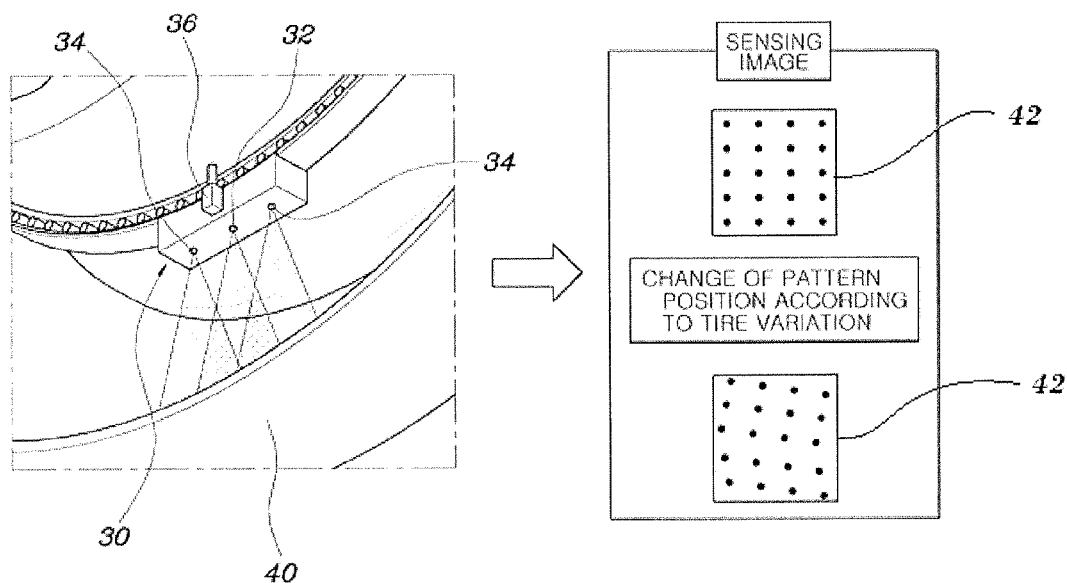
FIG. 7 is a view for describing a sensing operation of pattern information and a variation illustration of a pattern by the intelligent tire system according to the exemplary embodiment of the present invention.

FIG. 2 is a view for describing a tire measurement operating relationship in an intelligent tire system according to an exemplary embodiment of the present invention, FIG. 3 is a view showing an entire configuration of the intelligent tire system according to the exemplary embodiment of the present invention, FIG. 4 is an enlarged view of a shape of a sensor module in the intelligent tire system according to the exemplary embodiment of the present invention, FIG. 5 is a view for describing an installation position of a second magnetic substance in the intelligent tire system according to the exemplary embodiment of the present invention, FIG. 6 is a view for describing an arrangement relationship of a first magnetic substance and the second magnetic substance in the intelligent tire system according to the exemplary embodiment of the present invention, and FIG. 7 is a view for describing a sensing operation of pattern information and a variation illustration of a pattern by the intelligent tire system according to the exemplary embodiment of the present invention.

The intelligent tire system according to the exemplary embodiment of the present invention is generally configured to include a bearing assembly 20 and a sensor module 30.

Describing in detail with reference to FIGS. 2 to 7, the intelligent tire system according to the exemplary embodiment of the present invention is configured to include the bearing assembly 20 provided in a shape enclosing a wheel rim 10 and the sensor module 30 configured to be installed to relatively rotate with respect to the wheel rim 10 by the bearing assembly 20 to thereby always sense an inner surface of a tire 40 contacting a road.

That is, the sensor module 30 is relatively rotated with respect to the wheel rim 10 by the bearing assembly 20, such that even though the wheel is rotated according to a drive of a vehicle, the sensor module 30 is not rotated along the wheel by a relative rotation operation and a self-load of the bearing assembly 20. Therefore, the drive is made in the state in which the sensor module 30 is positioned at a lower end portion of the wheel rim 10, such that the sensor module 30 may continuously sense the inner surface of the tire 40, thereby making it possible to improve variation measuring precision of the tire 40.

Further, the bearing assembly 20 is configured to include an inner race 22 fixed to the wheel rim 10, an outer race 26 having the sensor module 30 fixed thereto and relatively rotating with respect to the inner race 22, and a roller 24 installed between the inner race 22 and the outer race 26.

That is, the wheel rim 10 is fixed to the inner race 22 and the sensor module 30 is fixed to the outer race 26, such that even though the wheel rim 10 is rotated, the rotation of the sensor module 30 is limited by the roller 24 installed between the inner race 22 and the outer race 26.

According to an exemplary embodiment of the present invention, the sensor module 30 may be configured to have a sensor 32 installed at an end portion thereof and sense the inner surface of the tire 40 contacting the road by the sensor 32.

That is, the sensor 32 installed in the sensor module 30 senses the inner surface of the tire 40 contacting the road, such that a change in the tire 40 compressed by contacting the road may be measured.

Here, the sensor 32 may be a camera sensor capable of photographing an image, but it is merely an example and an optical scheme using a light emitting diode and a light receiving unit, a surface acoustic wave scheme, and the like may be used.

Further, as shown in FIG. 7, the sensor module 30 may have a light source 34 installed at a side portion thereof, wherein the light source 34 may illuminate the inner surface of the tire 40 contacting the road.

That is, the light source 34 emits light toward the inner surface of the tire 40, such that the photographed image of the inner surface of the tire 40 by the sensor 32 may be more brightly and clearly photographed.

Here, a plurality of light sources 34 may be installed, wherein the light source may be the light emitting diode (LED).

In addition, the inner surface of the tire 40 may be provided with a pattern 42 and the sensor 32 may sense the pattern 42. Here, the pattern 42 may be a regular pattern 42 having a uniform shape and form as shown in FIG. 5, and may need to have the shape and form capable of being sensed by the sensor 32.

Further, as shown in FIG. 3, the intelligent tire system according to the exemplary embodiment of the present invention may be configured to further include a wireless transmitting unit 50 receiving information on the sensed pattern 42 from the sensor 32, a wireless receiving unit 60 receiving information on the pattern 42 input through the sensor 32 from the wireless transmitting unit 50, and an intelligent tire ECU 70 receiving information on the sensed pattern 42 from the wireless receiving unit 60 and calculating variation of information on the pattern 42 varied according to variation of the tire 40.

That is, when information on the pattern 42 recognized by the sensor 32 is input to the wireless transmitting unit 50, the wireless transmitting unit 50 transmits information on the pattern 42 to the wireless receiving unit 60 and information on the pattern 42 transmitted to the wireless receiving unit 60 is transmitted to the intelligent tire ECU 70. Then, the intelligent tire ECU 70 measures the variation of tire 40 from information on the pattern 42 and converts the measured variation of the tire 40 into force applied to the tire 40, such that the change of the tire varied according to the variation of the tire 40 may be measured.

A slip angle, a road friction coefficient, and the like of the tire 40 may be estimated by the measured change of the tire 40 as described above so as to be utilized in various chassis control logics.

Here, a position change of the pattern 42 may be variously varied in an X axis, a Y axis, and a Z axis according to the varied shape of the tire 40, and a specific measuring method of the variation of the tire 40 according to the varied shape of the pattern 42 may refer to a technology disclosed in Korean Patent Laid-Open Publication No. 10-2012-0060536.

Meanwhile, as shown in FIGS. 4 to 6, the intelligent tire system according to the exemplary embodiment of the present invention may be configured to further include a first magnetic substance 36 installed in the sensor module 30 and a second magnetic substance 86 installed on a car body positioned over the first magnetic substance 36 and limiting a rotation of the first magnetic substance 36 by magnetic force.

That is, the second magnetic substance 86 is installed on the car body positioned right above the first magnetic substance 36 in a state in which a rotation of the second magnetic substance 86 is limited, and attractive force attracting each other acts between the first magnetic substance 36 and the second magnetic substance 86. Therefore, an instantaneous rotation motion of the sensor module 30 to be rotated by friction force of the bearing at the time of acceleration and deceleration of the vehicle is limited by magnetic force of the first magnetic substance 36 and the second magnetic substance 86, such that the sensor 32 installed in the sensor module 30 may fixedly sense the pattern formed on the inner surface of the tire 40.

Further, the first magnetic substance 36 and the second magnetic substance 86 may be a permanent magnet or an electromagnet.

The first magnetic substance 36 may be the permanent magnet and the second magnetic substance 86 may be any one of the permanent magnet and the electromagnet.

The car body having the second magnetic substance 86 installed thereon may be a brake dust cover 80. That is, since the second magnetic substance 86 needs to be installed in a portion without the rotation motion while being installed to be adjacent to the position right above the first magnetic substance 36, it may be installed on the brake dust cover 80.

According to the exemplary embodiment of the present invention, the sensor module is relatively rotated with respect to the wheel rim by the bearing assembly, such that even though the wheel is rotated according to a drive of the vehicle, the sensor module may not be rotated along the wheel by the relative rotation operation and the self-load of the bearing assembly. Therefore, the drive is made in the state in which the sensor module is positioned at the lower end portion of the wheel rim, such that the sensor module may continuously sense the inner surface of the tire, thereby making it possible to improve variation measuring precision of the tire.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent tire system, comprising:
   a bearing assembly enclosing a wheel rim; and
   a sensor module installed to be relatively rotated with respect to the wheel rim by the bearing assembly and continuously sensing an inner surface of a tire contacting a road,
   wherein the bearing assembly includes:
      an inner race fixed to the wheel rim;
      an outer race having the sensor module fixed thereto and relatively rotating with respect to the inner race; and
      a roller installed between the inner race and the outer race.

2. The intelligent tire system according to claim 1, wherein the sensor module has a sensor installed at an end portion thereof, the sensor sensing the inner surface of the tire contacting the road.

3. The intelligent tire system according to claim 2, wherein the sensor module has a light source installed at a side portion thereof, the light source illuminating the inner surface of the tire contacting the road.

4. The intelligent tire system according to claim 2, wherein the sensor is a camera sensor.

5. The intelligent tire system according to claim 2, wherein the inner surface of the tire is provided with a pattern, and the sensor senses the pattern.

6. The intelligent tire system according to claim 5, further comprising:
   a wireless transmitting unit receiving information on the sensed pattern from the sensor;
   a wireless receiving unit receiving the information on the pattern input through the sensor from the wireless transmitting unit; and
   an intelligent tire Engine Control Unit (ECU) receiving the information on the sensed pattern from the wireless receiving unit and determining variation of the information on the pattern varied according to variation of the tire.

7. The intelligent tire system according to claim 1, further comprising:
   a first magnetic substance installed in the sensor module; and
   a second magnetic substance installed on a car body positioned over the first magnetic substance and limiting a rotation of the first magnetic substance by magnetic force therebetween.

8. The intelligent tire system according to claim 7, wherein the first magnetic substance and the second magnetic substance are a permanent magnet or an electromagnet.

9. The intelligent tire system according to claim 7, wherein the car body having the second magnetic substance installed thereon is a brake dust cover.

* * * * *